US012759849B2

(12) United States Patent
Dell'Aquila

(10) Patent No.: US 12,759,849 B2
(45) Date of Patent: Oct. 13, 2026

(54) FLEXIBLE FORM FACTOR BELT DRIVEN BLOCK AND TACKLE

(71) Applicant: Liftwave, Inc., Somerville, MA (US)

(72) Inventor: Kyle Dell'Aquila, Providence, RI (US)

(73) Assignee: Liftwave, Inc., Somerville, MA (US)

( * ) Notice: Subject to any disclaimer, the term of this patent is extended or adjusted under 35 U.S.C. 154(b) by 275 days.

(21) Appl. No.: 18/289,302

(22) PCT Filed: May 10, 2022

(86) PCT No.: PCT/US2022/028585
§ 371 (c)(1),
(2) Date: Nov. 2, 2023

(87) PCT Pub. No.: WO2022/240869
PCT Pub. Date: Nov. 17, 2022

(65) Prior Publication Data

US 2024/0228243 A1 Jul. 11, 2024

Related U.S. Application Data

(60) Provisional application No. 63/186,257, filed on May 10, 2021.

(51) Int. Cl.
*B66D 3/08* (2006.01)
*F16H 7/02* (2006.01)

(52) U.S. Cl.
CPC ................ *B66D 3/08* (2013.01); *F16H 7/02* (2013.01)

(58) Field of Classification Search
CPC .................................... B66D 3/08; F16H 7/02
USPC ........................................................ 74/89.22
See application file for complete search history.

(56) References Cited

U.S. PATENT DOCUMENTS 1,627,558 A * 5/1927 Grunwald ............ F16C 13/006 29/524.1
10,316,943 B2 6/2019 Motsanos
2012/0199800 A1 8/2012 Slob
(Continued)

FOREIGN PATENT DOCUMENTS

CN 201635450 U 12/2009
CN 201809059 U 4/2011
(Continued)

OTHER PUBLICATIONS

International Preliminary Report on Patentability in International Appln. No. PCT/US2022/028585, mailed Nov. 23, 2023, 8 pages.
(Continued)

*Primary Examiner* — T. Scott Fix
(74) *Attorney, Agent, or Firm* — Fish & Richardson P.C.

(57) ABSTRACT

This disclosure describes a belt driven block and tackle system. Traditionally flat belts have many advantages over wire ropes, including maintenance-free operation for an extended service life, a low cost of manufacture, and a reduced physical size in at least one dimension for a given set of working loads. The system includes a block and tackle including first pair of outer sheaves and a first pair of inner sheaves positioned between the first pair of outer sheaves, and a belt extending from a central point, around the first inner pair of sheaves, the first outer pair of sheaves, and out of the block and tackle.

5 Claims, 7 Drawing Sheets

(56) References Cited

U.S. PATENT DOCUMENTS

| | | | |
|---|---|---|---|
| 2016/0325130 | A1 | 11/2016 | Grund et al. |
| 2020/0256436 | A1 | 8/2020 | Sessions |

FOREIGN PATENT DOCUMENTS

| | | | |
|---|---|---|---|
| CN | 108862080 | A | 11/2018 |
| CN | 110217714 | A | 9/2019 |

OTHER PUBLICATIONS

International Search Report and Written Opinion in International Appln. No. PCT/US2022/028585, mailed Oct. 5, 2022, 11 pages.
Extended European Search Report in European Appln. No. 22808200.4, mailed on Oct. 11, 2024, 10 pages.

* cited by examiner

FLEXIBLE FORM FACTOR BELT DRIVEN BLOCK AND TACKLE

CROSS-REFERENCE TO RELATED APPLICATION

This application is a National Stage Application under 35 U.S.C. § 371 and claims the benefit of International Application No. PCT/US2022/028585, filed May 10, 2022, which claims priority to U.S. Provisional Patent Application No. 63/186,257 filed on May 10, 2021. The entire contents of which are hereby incorporated by reference.

TECHNICAL FIELD

This disclosure generally relates to nested architectures to provide flexible form factors for a belt driven block and tackle system.

BACKGROUND

Modern belts have many desirable characteristics. They can be lightweight, low-maintenance, and have high strength under tension. Many new and old applications of modern belts are currently being adapted.

SUMMARY

In general, the disclosure involves systems for configuring high reduction block and tackles with varying form factors. The system includes a block and tackle including first pair of outer sheaves and a first pair of inner sheaves positioned between the first pair of outer sheaves, and a belt extending from a central point, around the first inner pair of sheaves, the first outer pair of sheaves, and out of the block and tackle.

Implementations can optionally include one or more of the following features.

In some implementations, a first pair of intermediate sheaves is positioned between the first pair of outer sheaves, and the first pair of inner sheaves is positioned between the first pair of intermediate sheaves. In these implementations, the belt extends around the first pair of intermediate sheaves.

In some implementations, a second block and tackle is mounted adjacent to the first block and tackle. The second block and tackle includes a second pair of outer sheaves and a second pair of inner sheaves between the second pair of outer sheaves. The belt further extends around the second pair of inner sheaves and the second pair of outer sheaves and out of the second block and tackle.

In some implementations, the system includes a support plate, including a first face and a second face, and a sheave of the first pair of outer sheaves is mounted to the first face and a sheave of the second pair of outer sheaves is mounted to the second face. In some implementations, a sheave of the first pair of intermediate sheaves, and a sheave of the first pair of inner sheaves is mounted to the first face, and a sheave of the second pair of inner sheaves is mounted to the second face.

In some implementations, the first pair of outer sheaves and the first pair of inner sheaves include a stack of sheaves of varying diameters.

In some implementations, the first pair of outer sheaves and the first pair of inner sheaves include split sheaves.

In some implementations, the belt has a rectangular cross section.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

To describe technical solutions in the implementations of the present specification or in the existing technology more clearly, the following briefly describes the accompanying drawings needed for describing the implementations or the existing technology. The accompanying drawings in the following descriptions merely show some implementations of the present specification, and a person of ordinary skill in the art can still derive other drawings from these accompanying drawings without creative efforts.

Like reference numbers and designations in the various drawings indicate like elements.

DETAILED DESCRIPTION

Figure 1:
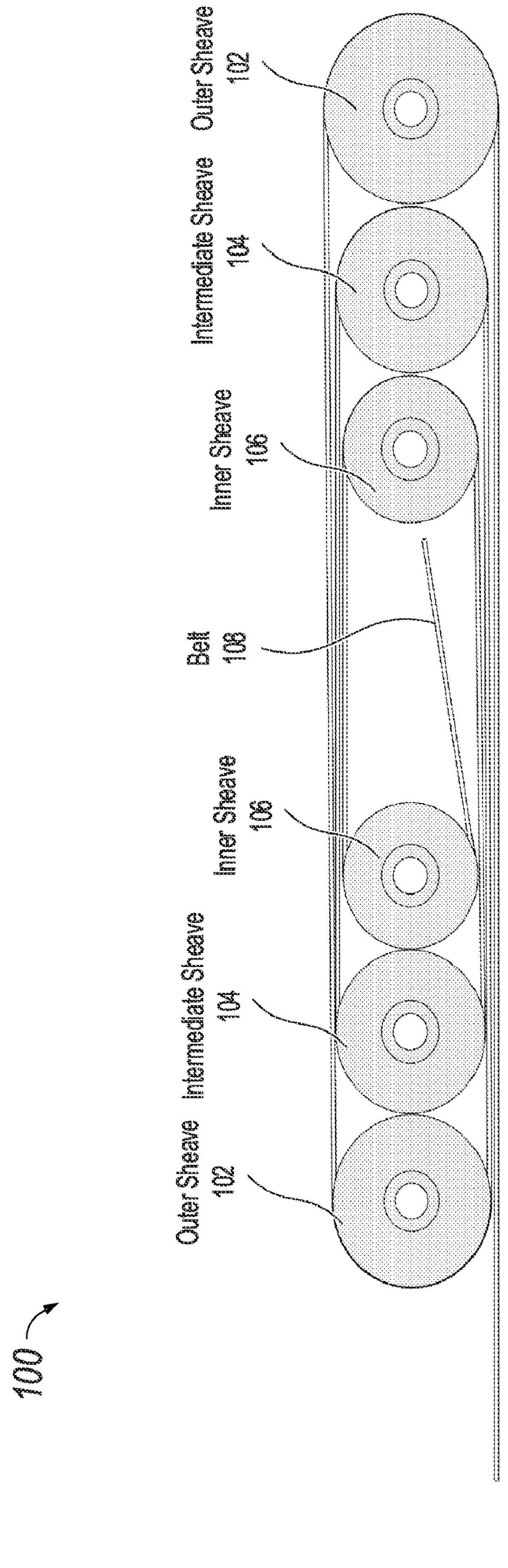
FIG. 1 depicts an example belt driven block and tackle system with nested sheaves.

This disclosure describes a belt driven block and tackle system. Traditionally flat belts have many advantages over wire ropes, including maintenance-free operation for an extended service life, a low cost of manufacture, and a reduced physical size in at least one dimension for a given set of working loads.

It is common practice, however, to exercise great caution in the application of flat belts, as incorrect placement or alignment of sheaves can result in premature (and potentially catastrophic) belt failure. Flat belts are more sensitive to sheave misalignment than wire ropes. In general, flat belts (i.e. belts with no teeth) are not intended for twisted geometries. To take a particular example, a fleet angle of 0.25-degree would shorten the service life of a wire rope by a noticeable fraction, perhaps reducing the working life by 15%. The wire rope must flex laterally over the flange to accommodate the required exit angle, but it is fully capable of flexing in this direction. Flat belts, on the other hand, are quite stiff in the direction orthogonal to their principal axis of flexion, and as a result, that same 0.25-degree fleet angle might shorten the life of a steel wire rope reinforced polyurethane flat belt by 95% or more.

One advantage that wire ropes maintain over flat belts is their ability to bend in any direction. This allows a designer to place sheaves that are out-of-plane with each other, enabling them to create much more complex arrangements of sheaves that provide enhanced functionality. Belts may likewise be implemented with out-of-plane sheaves, though the placement and arrangement of sheaves is more constrained than that of wire rope. If a belt is to be twisted in a free span between two sheaves, the span must meet a certain prescribed minimum length in general engineering practice. For a 90-degree twist, this span is generally recommended to be at least 20× the belt width. This metric is commonly referred to as the "twist ratio": the length of the free span divided by the belt width, multiplied by the 90 degrees divided by the twist angle.

$$\text{Twist Ratio} = \frac{\text{Free Span}}{\text{Belt Width}} * \frac{\text{90 Degrees}}{\text{Twist}}.$$

To take an example, consider a belt with a 20 mm width, a 300 mm free span, and a 45-degree twist. The twist ratio would then be 30:1 for this span. Twists that are more aggressive than 20:1 are generally not recommended in engineering practice, because the additional compaction benefit that the tighter twist might convey is accompanied by a severe reduction in service life.

In general, this disclosure discusses complex arrangements of sheaves for a flat belt system, which can be advantageous in terms of overall form factor, mechanical advantage (e.g., reduction), and ease of manufacturing, while maintaining the advantages of a belt driven system over a rope or wire driven system. A flat belt in this disclosure refers to a belt with a generally flat surface. While illustrated as having a rectangular cross section throughout, the belt can be any suitable shape. For example, the belt can have square, triangular, trapezoidal, or any combination thereof of cross sections. In some implementations, one portion of the belt may have a trapezoidal cross section, while another portion can be triangular. The present disclosure is not limiting thereto. Additionally, the belt can be constructed of any suitable material, for example, braided steel, Kevlar, rubber, leather, carbon fiber, or a combination thereof.

To help a person skilled in the art better understand the technical solutions in the present specification, the following describes the technical solutions in the implementations of the present specification with reference to the accompanying drawings. The described implementations are merely some rather than all of the implementations of the present specification. All other implementations obtained by a person of ordinary skill in the art based on one or more implementations of the present specification without creative efforts shall fall within the protection scope of the implementations of the present specification.

FIG. 1 depicts an example belt driven block and tackle system with nested sheaves. The system 100 of FIG. 1 includes a pair of outer sheaves 102, a pair of inner sheaves 106, and a pair of intermediate sheaves 104. In the illustrated example, different sized sheaves are used to achieve the required reduction. This arrangement utilizes the minimum amount of bend cycles to achieve the necessary reduction. Increasing the number of turns will increase the length of the blocks which in return, detriments the stroke available for a given overall size. With the illustrated form factor, additional intermediate sheaves 104 will increase the reduction of the system 100, at the cost of range of motion.

The belt can be anchored at a central point, and then wrapped around each of the pairs of sheaves (inner, intermediate, and outer) respectively before exiting the system 100. In some implementations instead of being anchored at the central point, the belt extends around an out-of-plane sheave and into an adjacent block and tackle system, as described in more detail below with respect to FIGS. 3A and 3B.

Figure 2:
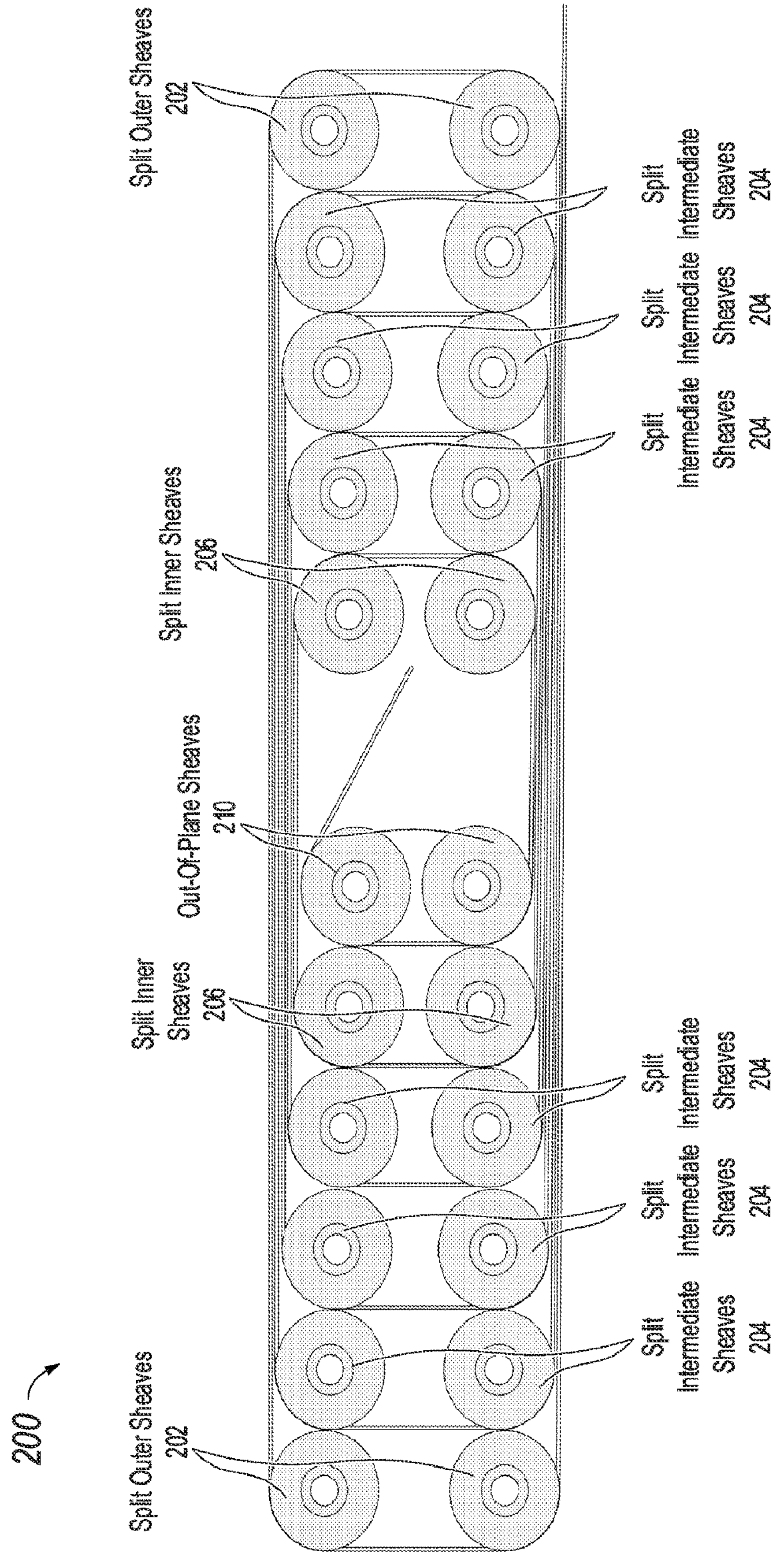
FIG. 2 depicts an example belt driven block and tackle system with nested, split sheaves.

FIG. 2 depicts an example belt driven block and tackle system with nested, split sheaves. In some implementations, the sheaves of varying sizes as illustrated in FIG. 1 are undesirable. It can be advantageous, in some cases, to allow use of a uniform sheave diameter throughout the system. Block and tackle system 200 illustrates a similar nested configuration as FIG. 1, except the sheaves are split sheaves, with uniform diameters. It should be noted that block and tackle system 200 includes additional intermediate sheaves 204 (3 pairs of split intermediate sheaves) as compared to block and tackle 100. FIG. 2 also illustrates a pair of out-of-plane sheaves 210, which will be described in greater detail below and with reference to FIG. 4. Split sheaves also enable increased flexibility in one or more dimensions. For example, the free span between each sheave of the split pair (e.g., split outer sheaves 202, split intermediate sheaves 204, and/or split inner sheaves 206) can be increased, resulting in a taller system, at no cost to overall length. In another example, each split pair can be positioned in an offset configuration, as illustrated and described with reference to FIG. 7B.

Figure 3A:
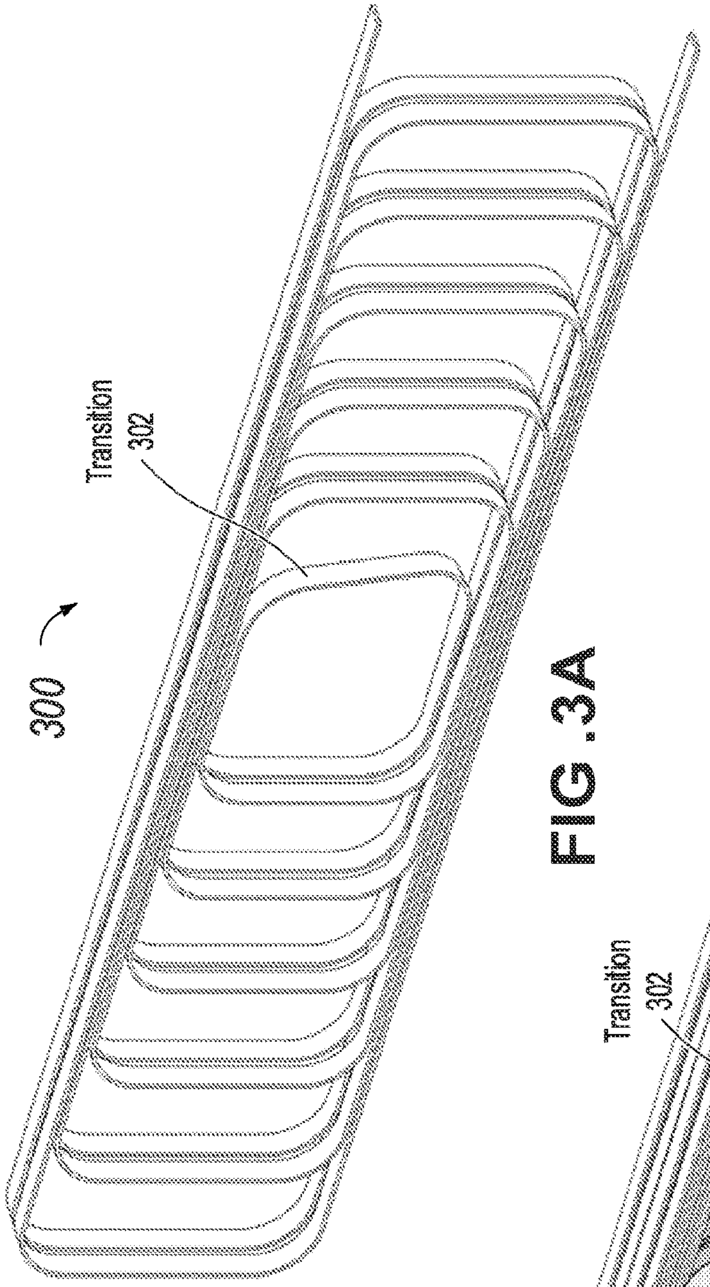
FIG. 3A depicts a belt of a stacked block and tackle system with split sheaves.

FIG. 3A depicts a belt of a stacked block and tackle system with split sheaves. Only the belt is shown for simplicity. System 300 is similar to two of system 200 as illustrated in FIG. 2, stacked adjacent to each other with a shared belt. The belt passes over a pair of out-of-plane sheaves at the transition 302. This results in a wider system 300, with a much greater reduction ratio. In some implementations, this system can be further stacked, (e.g., 4 or more additional sets of block and tackle can be mounted adjacent to system 300 with a shared belt). In this manner, a greater reduction is achieved as the overall system gets wider. By stacking multiple sets of block and tackle, or nesting multiple intermediate sheaves, the designer can select either a wide, or long, block as appropriate for the amount of reduction desired. In other words, different configurations are possible to achieve certain design parameters such as overall reduction, sheave number, external dimensions (e.g., width, height, length), and so on.

Figure 3B:
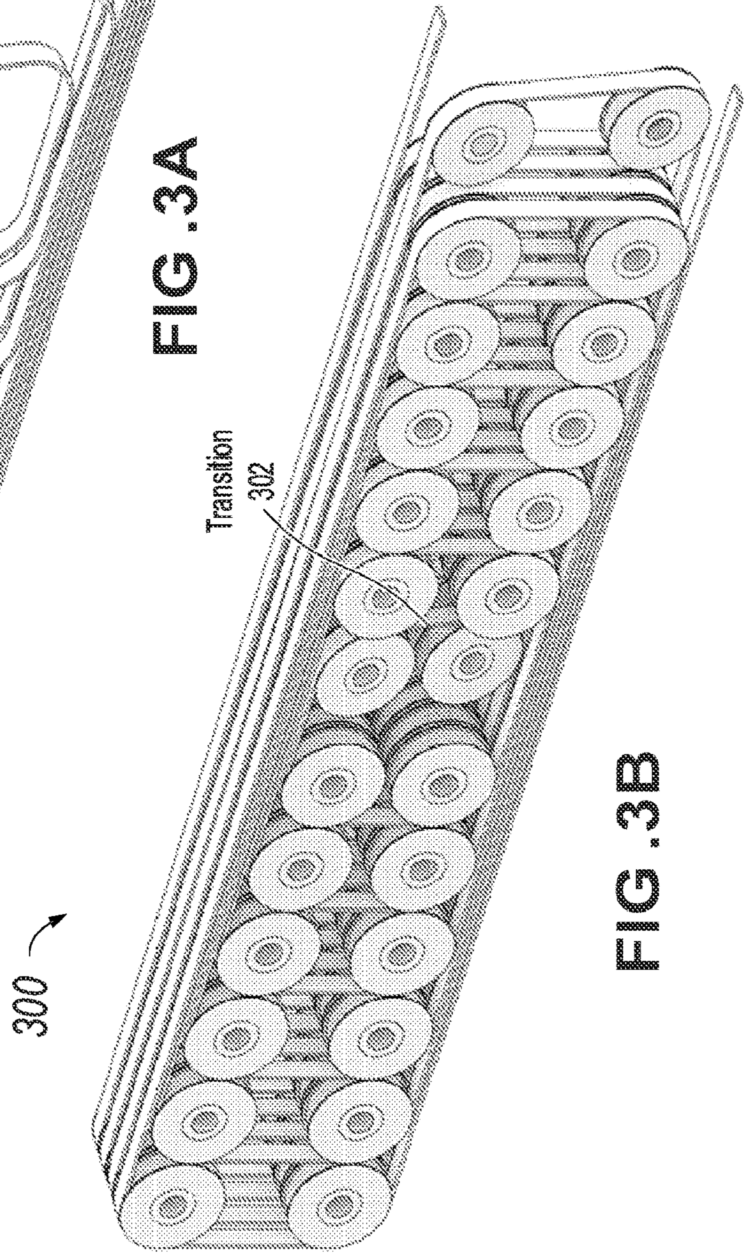
FIG. 3B depicts a stacked block and tackle system with split sheaves.

FIG. 3B depicts a stacked block and tackle system with split sheaves. FIG. 3B illustrates the same system 300 as FIG. 3A, with the split sheaves shown for clarity. It should be noted that certain structural and support elements have not been illustrated for simplicity.

Figure 4:
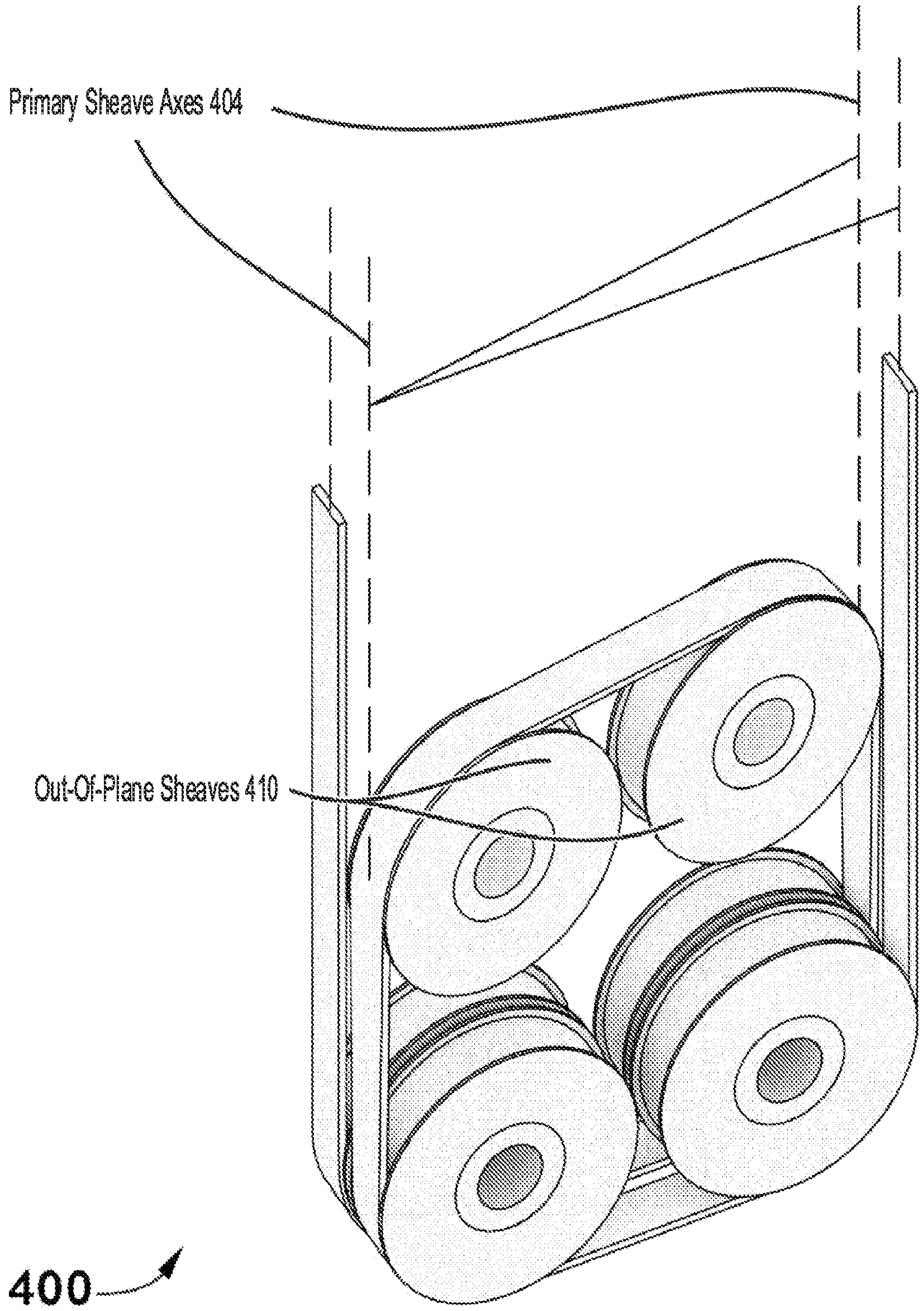
FIG. 4 depicts a portion of a block and tackle system showing an angled belt geometry to minimize belt wear.

FIG. 4 illustrates a portion of a block and tackle system 400 showing an angled belt geometry to minimize belt wear. The out of plane sheaves 410 are rotated, causing a twist in the free span of belt between the in-plane sheaves and the out-of-plane sheaves. In order to offset the additional wear that could be caused by the twist, the out-of-plane sheaves 410 are positioned off the primary sheave axis 404, to induce a fleet angle that counteracts the twist. This compensatory fleet angle is determined as a function of twist ratio, and width ratio which is defined as the centerline distance between outermost wire ropes in the belt divided by the sheave diameter. Out-of-plane sheaves 410 enable the use of multiple adjacent sheaves or entire block and tackle systems, which permits further reduction and flexibility in the overall form factor. It should be noted that while FIG. 4 is illustrated in a split sheave configuration, split sheaves are not necessary for out-of-plane sheaves 410.

Figure 5:
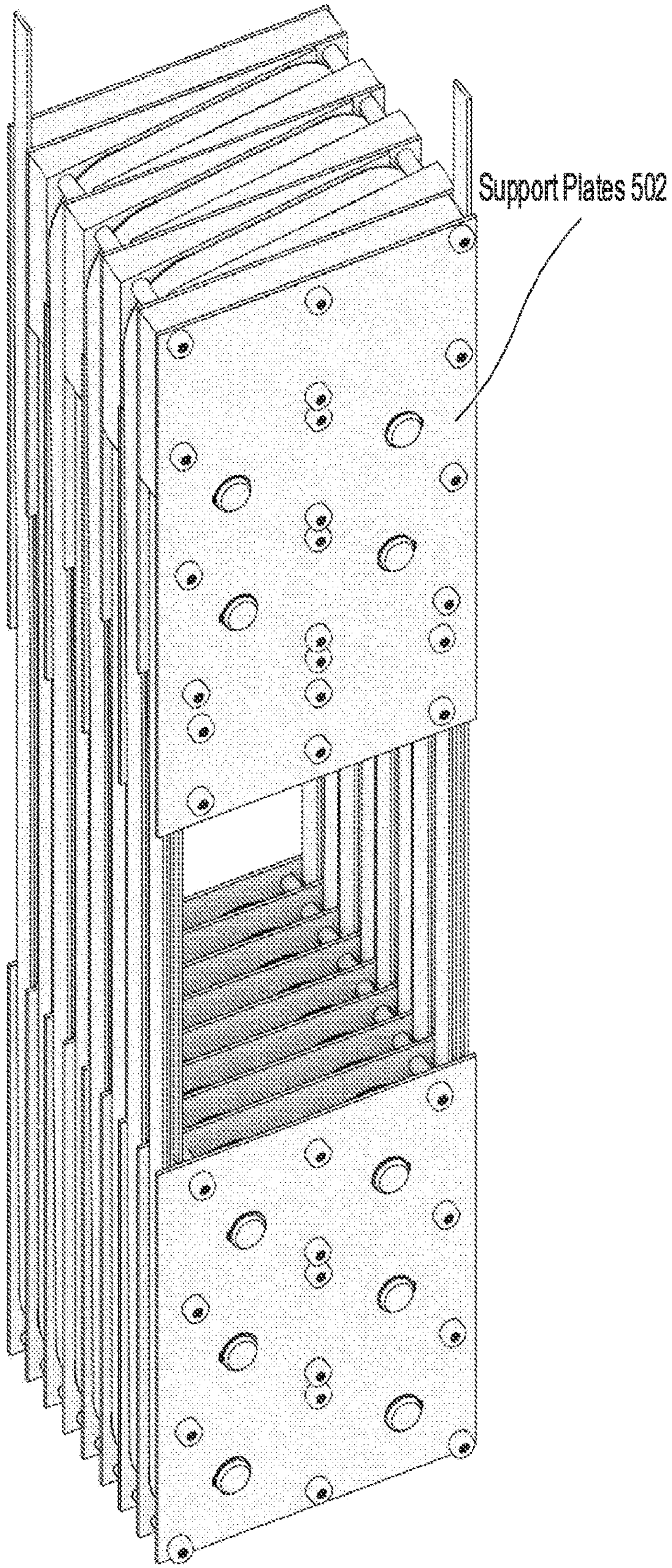
FIG. 5 depicts an end view of a stacked block and tackle system with support plates.

FIG. 5 depicts an end view of a stacked block and tackle system 500 with support plates 502. Stamped or drilled flat plates can be used to support sheaves in these configurations which can result in reduced manufacturing costs and complexity. In some implementations, the flat plate assembly provides convenient reference surfaces for mounting out-of-plane sheaves.

Figure 6A:
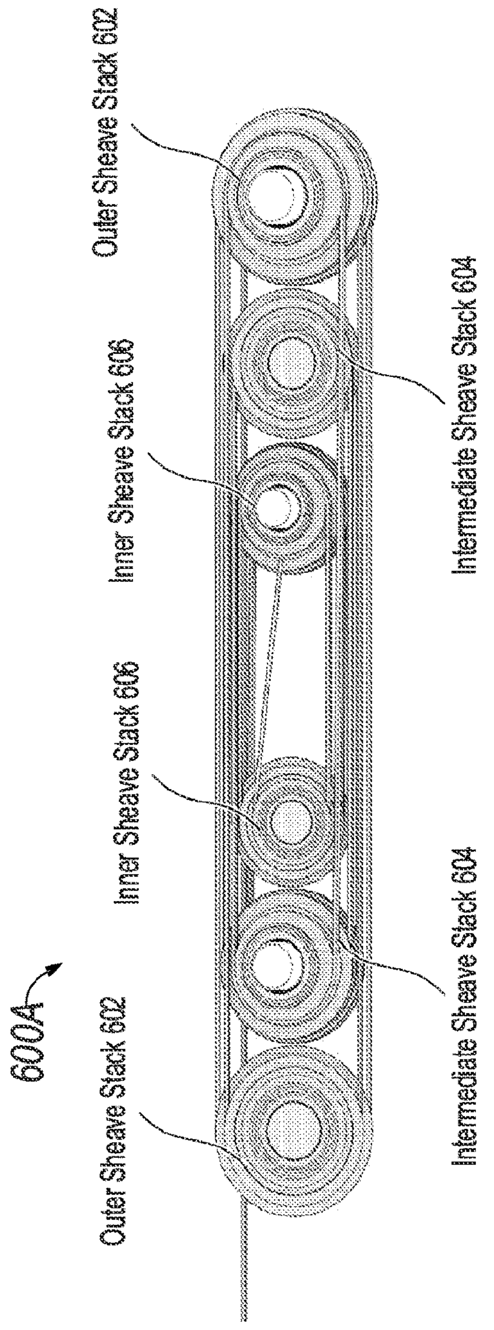
FIGS. 6A and 6B depict example belt driven block and tackle systems with sheaves sharing a common axis with an overall cylindrical form factor.
Figure 6B:
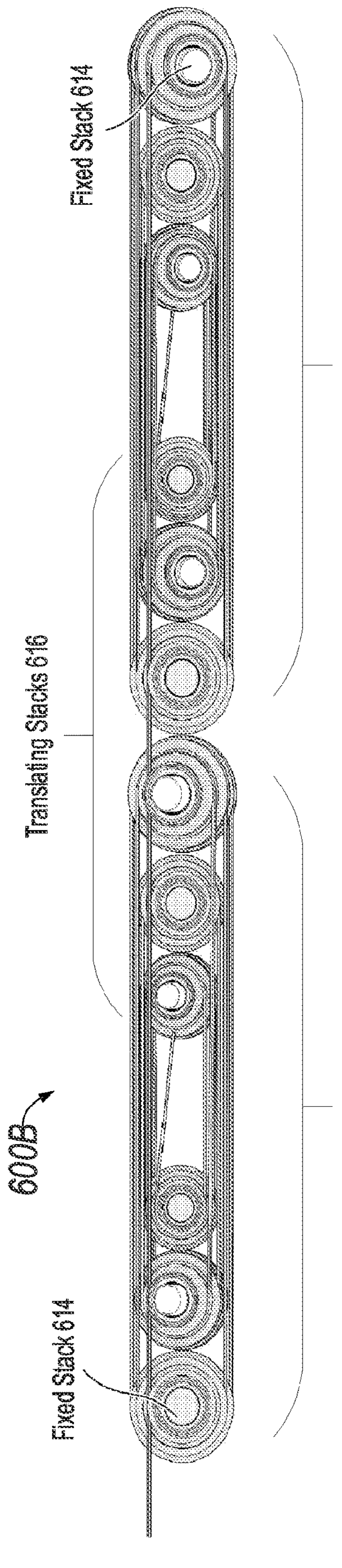

FIGS. 6A and 6B depicts example belt driven block and tackle systems with sheaves sharing a common axis with an overall cylindrical form factor. In these implementations, several sheaves sharing a common axis form sheave stacks, which further increase the reduction ratio. The sheave stacks (with 5 sheaves each in the illustrated example) have sheaves of varying diameters, with offset axes in order to minimize or reduce fleet angle misalignment.

The block and tackle system 600A is illustrated in a pull-only configuration, in that it is able to forcefully contract when belt is withdrawn from the system, however needs an external force to extend when belt is payed back into the system. This implementation can be useful in situations where a consistent load in a single direction can be relied upon. For example, a crane or lift acting against the force of gravity, or an adjustable tension support such as rigging on a sailboat or other tension structure. System 600A includes a pair of outer sheave stacks 602, a pair of intermediate sheave stacks 604 and a pair of inner sheave stacks 606. The belt can be anchored either at a central point in the block and tackle (as illustrated) or can be passed around a redirection sheave to an external anchor point.

The block and tackle system 600B includes a pull sheave set 610 and a push sheave set 612, which permits two way translation or extension and contraction of the system. In the illustrated example, the belt originates from an anchor in the pull sheave set, passing around the sheaves and out of the system to a capstan or other driver (not shown) and then back into the system around the sheaves of the push sheave set to an anchor in the push sheave set. In some implementations, the belt is externally anchored. Fixed stacks 614 can be rigidly supported by a housing member or structural support, while translating stacks 616 can be configured to slide in an axial direction as the belt is moved. For example, as the capstan rotates in one direction, it withdraws belt from the push sheave set 612 and pays it out to the pull sheave set 610. This causes the translating stacks 616 to move to the right in the illustrated example of FIG. 6B. Conversely, if the capstan rotates in the opposite direction, the translating stacks 616 will move to the left. A second structural member or housing can be affixed to the translating stacks 616, which can be the moving portion of an actuator.

Using sheave stacks as illustrated in FIGS. 6A and 6B can provide for space efficient fitting in a tubular form factor, which can be advantageous in sealed applications, applications that are required to withstand large pressure differentials (e.g., submerged, or pressurized), or where the system is expected to experience large lateral forces. This could be used, for example, as a standard hydraulic actuator replacement, in a forklift, excavator, or other application that conventionally uses a hydraulic actuator.

Figure 7A:
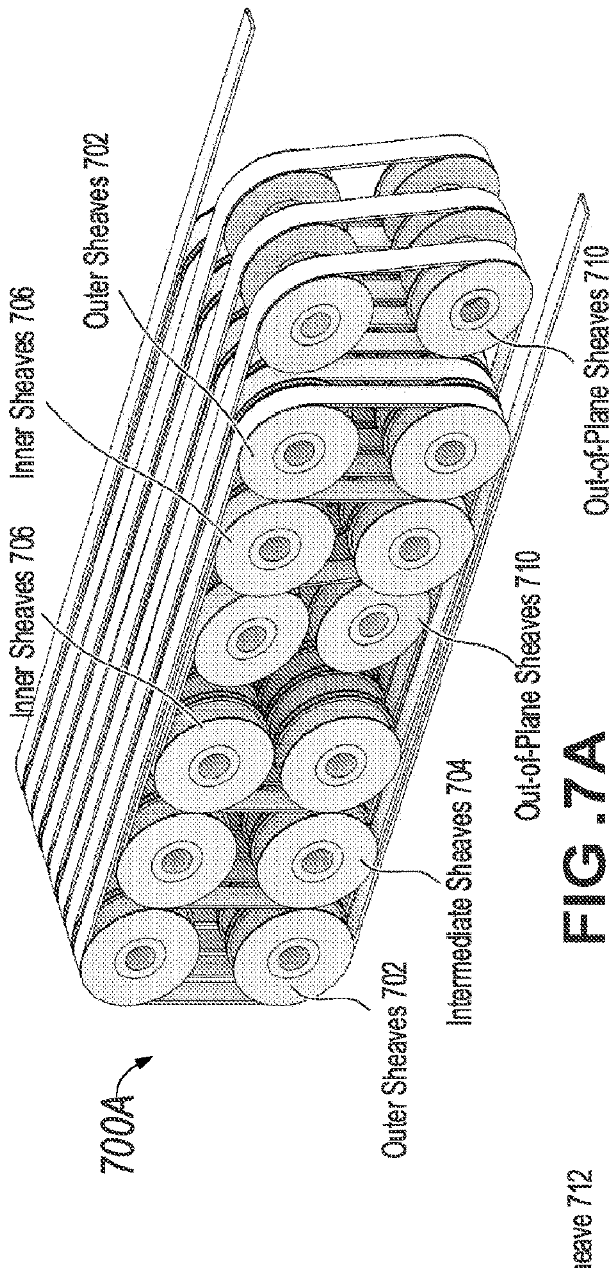
FIG. 7A depicts a belt driven block and tackle system with a wide form factor.

FIG. 7A depicts a belt driven block and tackle system with a wide form factor. Block and tackle 700A illustrates a stack of eight blocks and tackles, each with a pair of outer split sheaves 702, and a pair of inner split sheaves 706, and a single set of intermediate split sheaves on one of the blocks 704. A pair of out-of-plane sheaves 710 is used between each block and tackle to redirect the belt to the adjacent block and tackle. In this manner, a high reduction ratio can be achieved using a relatively short form factor and using uniform diameter sheaves which can be inexpensively manufactured and assembled. This might be advantageous in, for example, an elevator, where the block and tackle is mounted to the top of the shaft and the top of the elevator, and a relatively low profile axially is desired.

Figure 7B:
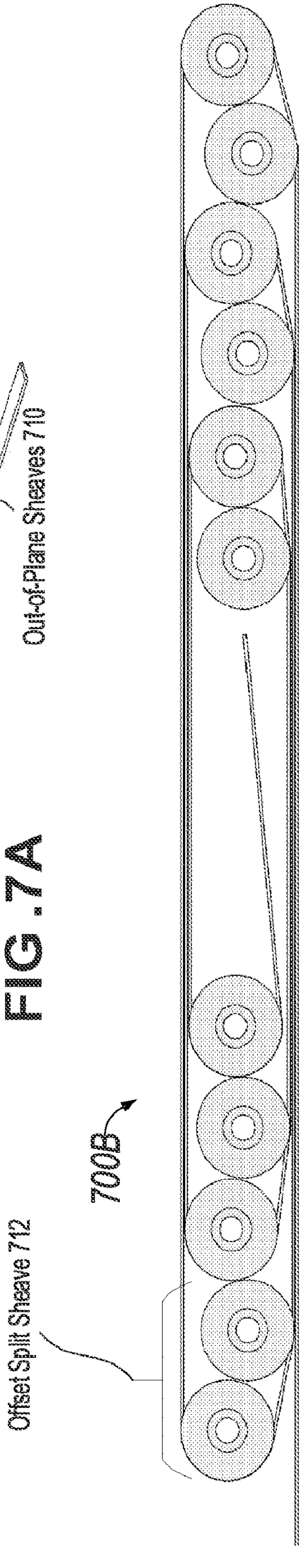
FIG. 7B depicts a belt driven block and tackle system with a narrow form factor and offset split sheaves.

FIG. 7B depicts a belt driven block and tackle system with a narrow form factor and offset split sheaves 712. If height is of concern, the split sheaves can be offset, resulting in a longer form factor of reduced height. Similarly, if height is not a concern, but length is, split sheaves can have large vertical separation, with intermediate sheaves nested within the split sheaves (not shown). This might be advantageous in, for example, a warehouse logistics robot, which is dimensionally constrained in a particular dimension (e.g., to fit underneath pallets, or within aisles of the warehouse).

The foregoing description is provided in the context of one or more particular implementations. Various modifications, alterations, and permutations of the disclosed implementations can be made without departing from scope of the disclosure. Thus, the present disclosure is not intended to be limited only to the described or illustrated implementations, but is to be accorded the widest scope consistent with the principles and features disclosed herein.

The invention claimed is:

1. A system for a belt driven block and tackle comprising:
- a first block and tackle comprising:
  - a first pair of outer sheaves;
  - a first pair of inner sheaves positioned between the first pair of outer sheaves;
  - a support plate comprising a first face and a second face, wherein a sheave of the first pair of outer sheaves and a sheave of the first pair of inner sheaves are mounted to the first face; and
  - a belt extending from a central point, around the first inner pair of sheaves, around the first outer pair of sheaves, and out of the first block and tackle;
- a second block and tackle comprising:
  - a second pair of outer sheaves; and
  - a second pair of inner sheaves between the second pair of outer sheaves, wherein the belt further extends from the central point, around the second inner pair of sheaves and around the second outer pair of sheaves out of the second block and tackle and wherein a sheave of the second pair of outer sheaves and a sheave of the second pair of inner sheaves are mounted to the second face; and
- a set of off-plane sheaves positioned to redirect the belt from the first block and tackle to the second block and tackle.

2. The system of claim 1, comprising a first pair of intermediate sheaves, wherein the first pair of intermediate sheaves are positioned between the first pair of outer sheaves, and wherein the first pair of inner sheaves are positioned between the first pair of intermediate sheaves.

3. The system of claim 1, wherein the first pair of outer sheaves and the first pair of inner sheaves each comprise a stack of sheaves of varying diameters.

4. The system of claim 1, wherein the first pair of outer sheaves and the first pair of inner sheaves comprise split sheaves.

5. The system of claim 1, wherein the belt has a rectangular cross section.

* * * * *